United States Patent
Ivanov

(10) Patent No.: US 9,948,115 B2
(45) Date of Patent: Apr. 17, 2018

(54) ACCUMULATOR BATTERY MANAGEMENT SYSTEM

(71) Applicant: OBSCHESTVO S OGRANICHENNOI OTVETSTVENNOSTYU "ENSOL TEKHNOLOGII", Moscow (RU)

(72) Inventor: Andrei Vladimirovich Ivanov, Ivanovo (RU)

(73) Assignee: OBSCHESTVO S ORGANICHENNOI OTVETSTVENNOSTYU "ENSOL TEKHNOLOGII", Moscow (RU)

( * ) Notice: Subject to any disclaimer, the term of this patent is extended or adjusted under 35 U.S.C. 154(b) by 212 days.

(21) Appl. No.: 14/778,901

(22) PCT Filed: Jul. 24, 2013

(86) PCT No.: PCT/RU2013/000635
§ 371 (c)(1),
(2) Date: Sep. 21, 2015

(87) PCT Pub. No.: WO2014/209161
PCT Pub. Date: Dec. 31, 2014

(65) Prior Publication Data
US 2016/0049811 A1    Feb. 18, 2016

(30) Foreign Application Priority Data

Jun. 27, 2013   (RU) .................................. 2013129441

(51) Int. Cl.
*H02J 7/00*     (2006.01)
*H01M 10/44*    (2006.01)
(Continued)

(52) U.S. Cl.
CPC ....... *H02J 7/0016* (2013.01); *H01M 10/4257* (2013.01); *H01M 10/441* (2013.01);
(Continued)

(58) Field of Classification Search
CPC ...... H02J 7/0021; H02J 7/0014; H02J 7/0016; H02J 7/0019; H02J 7/0024; H01M 10/052;
(Continued)

(56) References Cited

U.S. PATENT DOCUMENTS 5,821,729 A    10/1998  Schmidt et al.
7,061,207 B2   6/2006   Patel et al.
(Continued)

FOREIGN PATENT DOCUMENTS

CN    102969772 A    3/2013
JP    2001339865 A   12/2001
(Continued)

OTHER PUBLICATIONS

International Search Report with regard to PCT/RU2013/000635 dated Apr. 24, 2014.
(Continued)

*Primary Examiner* — Vuthe Siek
(74) *Attorney, Agent, or Firm* — BCF LLP

(57) ABSTRACT

The invention relates to chargers of lithium-ion batteries. The system contains a common control block and control blocks of each of the multitude of battery cells, where each cell of the multitude of cells is controlled by its own control block, which contains a micro-controller that has the capabilities to receive data about the condition of the cell, transfer the received information to the block of common control, and balance voltages of cells by high currents, where the balancing mode efficiently operates in any mode of the battery operation, where the multitude of cells of the
(Continued)

accumulator batter are connected in series by direct current, and in parallel by alternating current through the system of DC/AC converter balancing, where the converters are synchronized by the common control signal from the common control block. The invention reduces the charging time and increases the discharging time of the battery.

11 Claims, 2 Drawing Sheets

(51) Int. Cl.
  *H01M 10/46* (2006.01)
  *H01M 10/052* (2010.01)
  *H01M 10/42* (2006.01)

(52) U.S. Cl.
  CPC ........... *H01M 10/46* (2013.01); *H02J 7/0014* (2013.01); *H02J 7/0019* (2013.01); *H02J 7/0024* (2013.01); *H01M 10/052* (2013.01); *H01M 2010/4271* (2013.01); *H02J 7/0021* (2013.01)

(58) Field of Classification Search
  CPC ........... H01M 10/4257; H01M 10/441; H01M 10/46; H01M 2010/4271
  See application file for complete search history.

(56) References Cited

U.S. PATENT DOCUMENTS

| | | |
|---|---|---|
| 2005/0242667 A1 | 11/2005 | Emori et al. |
| 2010/0244781 A1 | 9/2010 | Kramer et al. |
| 2012/0105004 A1* | 5/2012 | Martinelli ............ H02J 7/0016 320/116 |
| 2012/0313441 A1 | 12/2012 | Nalbant |
| 2013/0033231 A1 | 2/2013 | Zhang |

FOREIGN PATENT DOCUMENTS

| | | |
|---|---|---|
| JP | 2009232660 A | 10/2009 |
| JP | 2012239300 A | 12/2012 |
| JP | 2013055800 A | 3/2013 |
| KR | 20120016993 A | 2/2012 |
| KR | 20120096280 A | 8/2012 |
| RU | 2314602 C1 | 1/2008 |
| SU | 1607045 A1 | 11/1990 |
| WO | 2010081746 A2 | 7/2010 |
| WO | 2013061461 A1 | 4/2015 |

OTHER PUBLICATIONS

English Abstract of RU2314602 retrieved from Espacenet on Sep. 14, 2015.
English Description of SU1607045 retrieved from Espacenet on Sep. 21, 2015.
English Abstract of KR 20120016993 retrieved on Espacenet on Oct. 26, 2016.
English Abstract of KR 20120096280 retrieved on Espacenet on Oct. 26, 2016.
English Abstract of CN 102969772 retrieved on Espacenet on Oct. 26, 2016.
English Abstract of JP 2009232660 retrieved on Espacenet on Oct. 26, 2016.
English Translation of JP2012239300.
English Translation of JP2001339865.
English Translation of JP2013055800.
Office Action issued by Japanese Patent Office with regard to the JP 2016-523694 dated Jun. 20, 2017.

* cited by examiner

ACCUMULATOR BATTERY MANAGEMENT SYSTEM

TECHNICAL FIELD

This invention relates to electrical engineering and can be used in the chargers of lithium-ion batteries.

BACKGROUND ART

Since the advent of lithium accumulators, the pressing problem of their use has arisen. For example, when used on electric transport with high capacities and currents, such accumulators proved to be very sensitive to overcharge and overdischarge, which causes their breakdown. Accumulators are also sensitive to incorrect operation (memory effect, battery polarity reversal, sulphation, etc.); however, with low capacities and relatively low price, this problem is not that important. The Accumulator Battery Management System (ABMS) solves the task of maintaining the accumulator battery in an optimum condition over a long period of time without the need of frequent intervention of specialists for periodic maintenance and diagnostics. The ABMS also solves a number of secondary tasks related both to the maintenance and diagnostics (in case of serious problems) and (in the long-term perspective) to the addition of new functionality such as monitoring the position of a motor vehicle.

During the operation of accumulator batteries (AB) based on the lithium-ion technology, the task arises of maintaining the cells of ABs in a well-balanced condition because the cells, since they come out of the manufacturing premises, have slightly differing characteristics and this difference can aggravate over time. Without regular monitoring of its condition, an AB can break down rather quickly.

When charging an AB, overcharge of battery cells should be prevented because such overcharge, when one cell is overcharged, causes the charger to stop the process and other batteries could remain not fully charged.

This task has been conventionally solved using special devices called the Battery Management System (BMS) that perform the following functions:
  prevention of overcharge of cells (as soon as voltage at any cell becomes lower than a certain threshold, the BMS will forcibly switch off the load until the battery is not put to the charger again);
  prevention of overcharge of cells (as soon as voltage at any cells becomes higher than a certain threshold, the BMS switches off the charger);
  balancing of cells (when voltage at any cell becomes higher than a certain threshold, which is below the switch-off threshold of the charger, the BMS starts using the excessive charge from the cell through a special energy-consuming element).

When the balancing of the cells is provided, it means either voltage or charge of the cells equalizing. There are two methods to perform the balancing:
  passive,
  active.

When passive balancing is used, the excessive charge of some cells is spent uselessly through resistors so that other cells could continue charging. Such system is simple but it evolves a lot of heat, requires a long time and works only during the charging process. In case of battery discharge, the passive system can switch out the entire battery only, when the weakest cell gets discharged. Thus, the capacity of the entire battery (in ampere-hours) will be equal to the capacity of the weakest cell.

From the prior art, the integrated circuit BQ77PL900 is known, which provides protection of battery blocks with 5-10 batteries connected in series. The said integrated circuit is a functionally complete device and can be used for operation with a battery pack. Comparing voltage of the cell with the threshold, the integrated circuit, if necessary, switches on the mode of balancing for each of the cells. If voltage of any battery exceeds the set threshold, field transistors are switched on and connect the load resistor in parallel to the battery cell, through which the current bypasses the cell and is charging it. In the meantime, the remaining cells continue charging. If voltage drops down, the field transistor gets closed and the charging can continue. Thus, in the end of charging, equal voltage will be present at all cells.

If the balancing algorithm is applied, which only uses voltage deviation as the criterion, incomplete balancing is possible because of the difference of internal resistance of the batteries, where part of voltage is dropping, then current runs through the accumulator, which, in turn, brings an additional error into the spread of voltage in the charge. The integrated circuit of battery protection cannot determine what causes the imbalance—the different capacity of batteries or the difference of their internal resistances. Therefore, with such passive balancing, there is no guarantee that all batteries will be charged for 100%.

The integrated circuit BQ2084 uses the improved version of balancing, which is also based on the changing of voltage but in order to minimize the effect of the spread of internal resistances, BQ2084 carries out the balancing closer to the end of the charging process, when the value of charging current is not high.

In this technology, the charge $Q_{need}$ is calculated for each battery required for its full charging, after which the difference between $Q_{need}$ of all batteries is found. Then the integrated circuit switches on the power keys, which discharge all cells to the level of the least charged cell until the charges are equalized.

Since the difference of internal resistances of the batteries does not influence this method, it can be applied at any time, both during charging and during discharging of the accumulator. The main advantage of this technology is a higher balancing of the batteries as compared with other passive methods.

Active systems of control are classed under two classes: the capacity-type systems (built on capacitors) and induction-type systems (built on throttle) all such systems are characterized by the re-distribution of the charge between the cells and such re-distribution only occurs between the neighboring cells of group of cells. Capacity and induction can accumulate the charge and give it up. This is the principle on which the balancing is built. The accumulative cell (C or L) gets connected to the accumulator and accumulates energy from it, and then it gets connected to the neighboring accumulator and gives up the accumulated energy if the connected accumulator has a lower voltage than the accumulative cell. The balancing is achieved over many cycles of energy transfer between the accumulators and the accumulative cells.

Energy is transferred between two neighboring cells of the accumulative battery. By its energy efficiency, this method exceeds the passive balancing because it performs the transfer of energy from the cell with a higher charge to the cell with a lower charge with minimum losses of energy.

This method is preferred in cases when it is required to ensure the maximum time of operation without recharging.

From the prior art of active balancing of batteries, the integrated circuit BQ78PL14 of the company TI is known, which is manufactured by the technology PowerPump, which uses the inductive converter for the transfer of energy. PowerPump is using the n-channel p-channel field transistors and a throttle which is positioned between a pair of batteries. The field transistors and the throttle act as a down converter/up converter. Energy losses are not high during this process and all energy runs from the highly-charged battery to the low-charged battery. Because of high current of balancing, the PowerPump technology is more efficient than the normal passive balancing with dissipation of energy. In case of balancing of a battery pack of a laptop, balancing currents are 25-50 mA. Through selection of the values of components, the efficiency of balancing can be achieved, which is in 12-20 times better than with the passive method with internal keys. Typical values of imbalance (below 5%) can be achieved in one or two cycles.

From the prior art, the charge pumping integrated circuit ICL7660 (MAX1044 or the Russian analog KP1168EΠ1) is known, which uses not an inductive-type but capacity-type accumulator (transformation of voltage on switchable capacitors). This integrated circuit is mainly used for gaining negative voltage equal to its source voltage. However, if negative voltage at the exit is, for whatever reason, higher than the positive source voltage, the integrated circuit will start pumping the charge "to the reverse direction", taking up from the minus and giving up to the plus, i.e. it continuously tries to equalize these two voltages. This feature is used for the balancing of two accumulator cells. The integrated circuit with high frequency connects the capacitor either to the upper or to the lower accumulator. Consequently, the capacitor will be charging from the more charged accumulator and discharging to the less charged accumulator, each time transferring a portion of the charge. Over time, voltages on accumulators will become equal. This system does almost not dissipate energy; the efficiency of the system can reach 95-98% depending on the voltage on accumulators and output current, which depends on the frequency of change-over and capacitor.

Besides, consumption of the integrated circuit only amounts to some dozens of micro-amperes, i.e. it lies below the level of self-discharge of many accumulators and it will perform the work of equalizing voltages on cells. The pumping current may reach 30-40 mA, however the efficiency drops during this process. The source voltage may be from 1.5 to 10 V and this means that the integrated circuit can balance both conventional AA batteries and lithium accumulators.

SUMMARY OF INVENTION

This invention is intended for protection, condition monitoring, balancing of ABs during charging/discharging and pertains to the big and versatile class of devices known in the world as the BMS (Battery Management System). The invention can be used with efficient energy storage units based on lithium-ion accumulators for electric transport, uninterruptible power supply systems, off-grid storage units, and stationary devices of uninterruptible (emergency) power supply.

The main advantages of using this invention are the following: reduction of the charging time and increase of the discharging time of the battery. During discharging, the less capacious cells will receive energy from the more capacious, and during charging the less capacious cells will give up the excessive charge to the more capacious cells. During these processes, the capacity of the entire battery (in ampere-hours) will approximately correspond to the average capacity of all cells, and in watt-hours, to the sum of watt-hours of all cells.

During charging of the AB, not only the cell voltage is taken into account but also its internal resistance. This allows accelerating the process of charging the cell, because early switch-offs of the charger are prevented as the total voltage on the cell (which consists of the internal voltage of the cell plus its internal resistance multiplied by the charging current) exceeds the threshold voltage. In balancing of the AB, the new technical solution is used, which allows redistribution of energy from more capacious cells to less capacious cells. The used solution allows reaching balancing currents that are by three orders of magnitude higher than balancing currents of conventional BMS (dozens, hundreds of amperes against dozens and hundreds of milliamperes). Besides, the proposed technical solution gives saving in energy consumption because the excessive charge of the cell does not dissipate in the heating element but gets redistributed to other cells with a higher efficiency (90% and higher).

In order to achieve the said result, an accumulator battery was created that consists of many cells. This accumulator battery has a distinct feature: battery cells are connected in series by direct current, and in parallel by alternating current through the system of transformer balancing. Each cell must be equipped with a DC/AC converter.

For efficient operation of the accumulator battery, it is suggested to use a control block that contains a block of common control and control blocks of each of the cells of the accumulator battery. Each cell is controlled by its own control block that can contain a micro-controller that has a capability to receive data about the condition of the cell, transfer of the received information to the block of common control and balancing of voltages of cells by high currents (upon receiving a control command from the common control block). The mode of balancing can operate during charging and during discharging of the battery and also at rest.

It is assumed that converters of the accumulator battery can be synchronized by the common control signal from the common control block or, depending on the condition of the cell, perform synchronous DC/AC and AC/DC conversion upon the signal from the control system.

A detailed description of the accumulator battery is given below.

The accumulator battery consists of a chain of cells connected in series or groups of cells connected in parallel (such groups are further treated as a single cell with an increased capacity). Battery current is common for all cells during charging and discharging, but since cell capacity varies in the general case (due to manufacturing tolerance or aging), cells will become fully discharged (charged) at different times. In order for all cells to come to this point at the same time, it is necessary that the current in each cell depend on its capacity, and this is possible only when cells are connected in parallel.

The proposed solution allows connecting in series and in parallel at the same time. By direct current all cells are connected in series, and by alternating current they are connected in parallel, through converters. To this end, each cell is equipped with an individual DC/AC converter, the direct current comes to the converter and through it to the common balancing bus. Secondary windings of converters from all cells are connected in parallel. All converters are synchronized by the common control signal. While there is a synchronizing signal, cells exchange energy between each other on the principle of communicating vessels, those cells that have a higher potential, dump the energy to the balancing bus, and the rest are powered from it. The process continues till the full potential equalization of cells, or till the synchronization signal ceases.

The device, in its basic configuration, consists of two types of units: a common control card and control cards of individual cells. The quantity of the latter depends on the number of cells in the battery.

The common control card performs functions of general coordination of all actions performed over the accumulator battery. It is this card that monitors the functioning of individual cells (it receives this information from the control card of an individual cell) and decides what action should be taken. Here is the short list of what it does:

- enables or disables the charging mode, communicates with the charger and selects the correct charging current (if it is provided by the charger);
- shuts down the load when the battery overdischarges;
- performs functions of battery protection form accidental overloads and short circuits;
- in case of detecting battery imbalance, it turns on the balancing mode and manages all control cards of individual cells, synchronizing their work;
- if necessary, it provides the engineer with access to full information on the battery condition. Access is provided through computer connection to the management system of the accumulator battery using a special program;
- turns on visual and acoustic alarm in case of emergency situations.

The control card of individual cells execute commands of the common control card. It also contains the load-bearing elements that provide battery balancing by high currents; these elements are also controlled by the common control card. The control card of individuals cells performs the following functions:

- measurement of cell voltage;
- measurement of balancing current;
- calculation of the cell charge that leaked through the balancing chain (it is necessary for the common control card to calculate the charge level of individual cells);
- transfer of measured and calculated data on demand of the common control card;
- transfer of the signal to the common control card when cell voltage is beyond the maximum permitted values.
- cell voltage balancing on the common control card's command.

DESCRIPTION OF EMBODIMENTS

Figure 2:
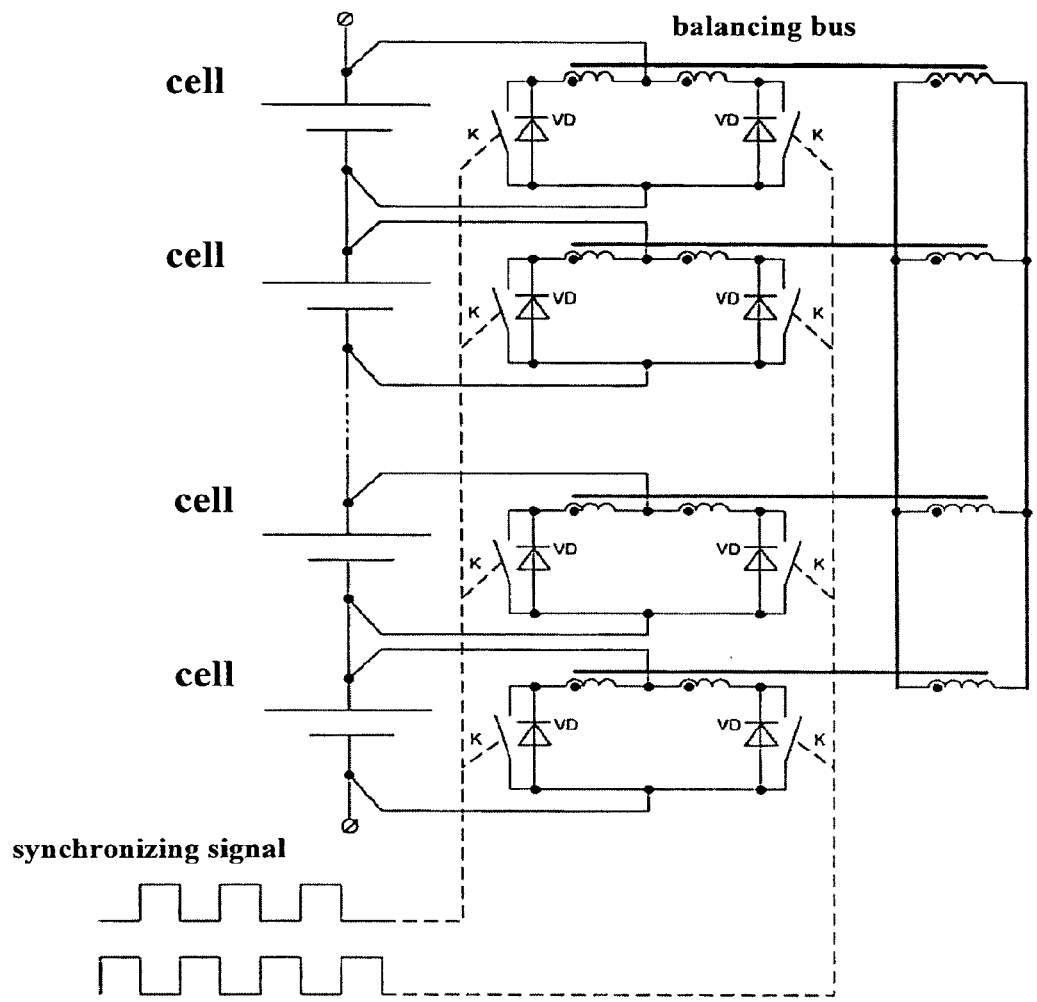
FIG. 2 shows a block diagram of a battery that is equipped with a transformer balancing system
Figure 1:
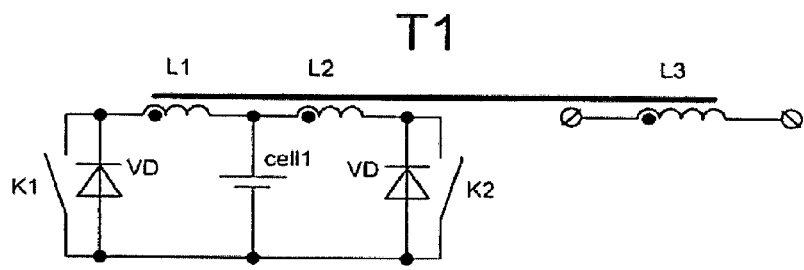
FIG. 1 shows a block diagram of the converter balancing module for each cell. The module of each cell consists of the cell itself and a converter circuit, which consists of the keys K1 and K2 that are connected with the cell Cell 1 through windings L1 and L2 of the transformer T1. With the closure of the key K1, current starts flowing through winding, while winding L3 induces EMF (electromotive force), which is proportional to the cell voltage.
Figure 3:
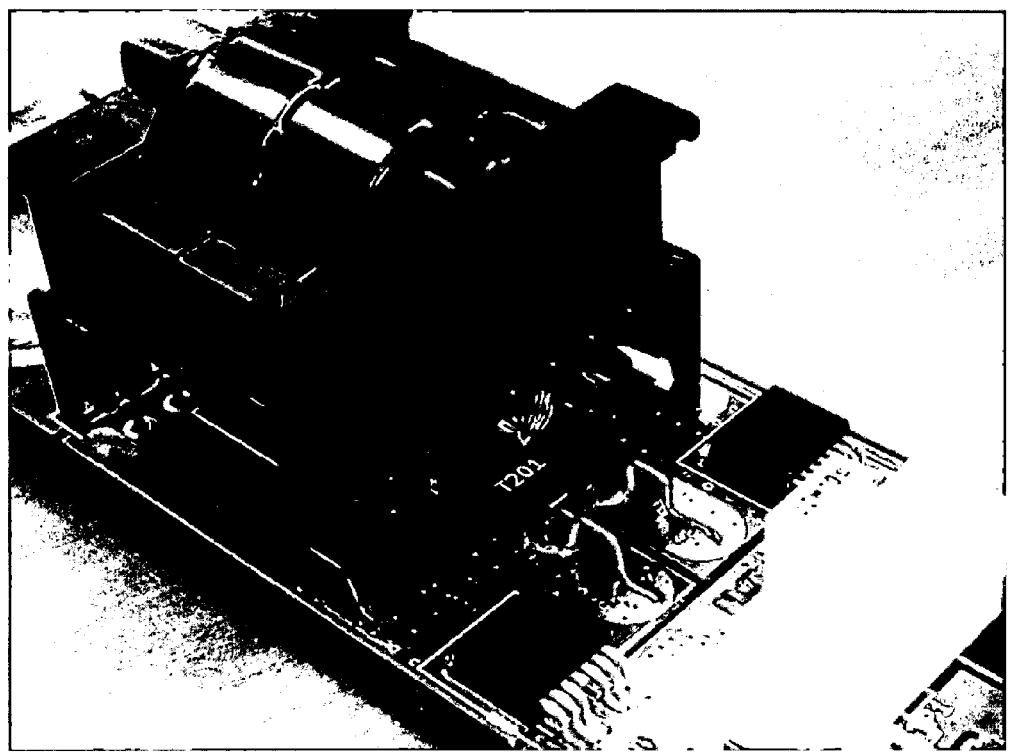
FIG. 3 shows a general view of the converter auto-balancing module.

With the closure of the key K2, current flows through winding L2, winding L3 also induces EMF that is proportional to the cell voltage, but of the opposite polarity. Keys K1 and K2 operate alternately under the control of an external synchronized signal, so L3 winding outputs contain alternating voltage that is proportional to the cell voltage. The proportionality factor is set by the transformation ratio of the transformer T1. If a system has more than one module and L3 winding outputs are combined by the balancing bus (FIG. 2 shows a block diagram of a battery that is equipped with a transformer balancing system), then this bus will have the voltage that is proportional to the voltage of cells with the highest potential, these cells will become donors, and others—recipients. Windings L1 and L2 of the donors will be primary windings and winding L3 secondary windings. In recipients, on the contrary, L3—is primary winding, and L1 and L2 are secondary winding, keys K1 and K2 will serve as synchronous rectifiers for recipient cell power.

Through the balancing bus all cells are connected in parallel and equally, i.e. energy can flow from any cell to any other, direction depends on the difference of cell potentials.

This management system of accumulator battery, unlike the balancing methods known in the world, is based on the method of transformer auto-balancing, which consists in the following: each of the accumulator cells of the battery is connected through primary winding with a transformer and synchronous rectifier, clocked from the battery control module, and the secondary windings of transformers are connected between each other, combining cell control modules into a common system. This allows virtual in-parallel connection of all cells of the battery to each other through alternating current. Which, in turn, allows ongoing balancing in any operation mode of the AB. The operation principle is based on the fact that generated variable voltages at the output of secondary windings of transformers will differ depending on the cell voltage, to which the transformer is connected. And, respectively, balancing currents will flow from those transformers where secondary-winding voltage is higher, and flow into those that have lower secondary-winding voltage, thereby balancing of the accumulator batteries cells will be performed.

The main distinguishing feature of the proposed solution is that the system allows pumping energy from any cell to any cell, regardless of on which potential of the battery the donor and recipient cells are situated. Also, it is necessary to emphasize system's ability to develop balancing currents of around 20-50 A at this stage of development. Balancing currents depend on the level of battery imbalance (the higher imbalance, the higher balancing current is). This allows using the balancing in any battery operation mode, taking into account estimated load currents of the battery and the required balancing speed.

System's power consumption is minimal and comparable to leakage currents of the accumulator batteries, which suggests the system efficiency of not less than 90%.

According to the above mentioned classification of BMS, battery management system at this stage of development relates to BMS with active balancing and voltage balancing algorithm.

Through the balancing bus, it is possible to charge the battery, in order to do this, it is enough to provide required power voltage to the balancing bus, which is correlated in the frequency and phase with the work of the keys. This will be equivalent to the connection of another cell to the balancing bus, but with an infinite capacity and voltage corresponding to a fully charged cell. Currents of each cell will be different and depend on their condition, and all cells will be charged at the same time.

There is a chance of battery discharging through the balancing bus. Since balancing bus voltage does not depend on the number of cells in the battery, one loading device can be used to discharge batteries with different total voltage, which can be convenient for CCC (cell cycle control).

With sufficient power of transformers and keys, system of transformer balancing can replace one or several cells that are missing in the battery for some reasons if the load currents will be comparable with the balancing currents.

On the experimental unit consisting of two 200 Ah cells, connected only by the balancing bus, at a potential difference of cells of 0.5 volts, current of pumping from one cell to another was 20-25 A.

Discharging one cell with the current of 20 A, discharging current was recorded of the second cell that is not connected to the load. Current grew to 20 A while the first cell was discharging, and upon reaching 0.5 volts potential difference of cells, discharging of the first cell almost ceased, as the discharging current equaled with the charge current that came from the second cell.

During charging of one cell with the steady current of 20 A, charging current was recorded of the second cell that is not connected to the charging device. The pumping current grew with growth of cells potential difference and upon reaching 0.5 volts, the first cell almost ceased to charge, as all incoming current was pumped through the balancing bus to the second cell.

The invention has been disclosed above with the reference to specific options of its implementation. Specialists may see other options of implementation of this invention that do not alter its essence, as it was disclosed in this description. Respectively, the invention should be deemed limited in scope only by the following summary of invention.

The invention claimed is:

1. An accumulator battery comprising:
a plurality of battery cells,
each battery cell of the plurality of battery cells being equipped with a respective DC/AC converter and a respective transformer,
each DC/AC converter being configured by a circuit with a push-pull output to preform one of DC/AC and synchronous AC/DC conversion based on a condition of respective battery cell of the plurality of battery cells,
the plurality of battery cells being connected in series by direct current and in parallel by alternating current through secondary windings of the transformers of the battery cells of the plurality of battery cells through a common balancing bus.

2. The accumulator battery of claim 1, wherein the circuit of the DC/AC converter with the push-pull output is the circuit where a primary winding of the transformer of respective battery cell of the plurality of battery cells has output from a middle thereof.

3. The accumulator battery of claim 1, further comprising common control block and a plurality of control blocks, each of the plurality of control blocks being associated with a given one of the plurality of battery cells.

4. The accumulator battery of claim 3, wherein each of the plurality of battery cells is controlled by a dedicated control block containing a micro-controller, the micro-controller being configured to receive data representative of the condition of the associated battery cell, to transfer the received data to the common control block, and in response to receiving a control command from the common control block, to balance voltages of the plurality of battery cells by high currents.

5. The accumulator battery of claim 4, wherein the micro-controller is configured to balance the voltages during charging, during discharging, and at an idle slate of the accumulator battery.

6. The accumulator battery of claim 1, wherein the DC/AC converters are synchronized by a common signal from the common control block in order to start a balancing mode for exchanging energy between the battery cells.

7. The accumulator battery of claim 6, wherein the accumulator battery provides an auto-balancing mode.

8. An accumulator battery comprising:
a plurality of battery cells being connected in series by direct current and in parallel by alternating current through a converter-balancing-system; and
common control block and a plurality of control blocks, each of the plurality of control blocks being associated with a given one of the plurality of battery cells;
wherein each of the plurality of battery cells is controlled by a dedicated control block containing a micro-controller, the micro-controller being configured to receive data representative of a condition of the associated battery cell, to transfer the received data to the common control block, and, in response to receiving a control command from the common control block, to balance voltages of the plurality of battery cells by high currents.

9. The accumulator battery of claim 8, wherein the micro-controller is configured to balance the voltages during charging, during discharging, and at an idle state of the accumulator battery.

10. An accumulator battery comprising:
a plurality of battery cells being connected in series by direct current and in parallel by alternating current through a converter-balancing-system, each battery cell of the plurality of battery cells being equipped with a respective DC/AC converter, the DC/AC converters being synchronized by a common signal from the common control block.

11. The accumulator battery of claim 10, wherein the DC/AC converters are configured to receive a signal representative of a condition of the plurality of the battery cells and based on the condition of the plurality of battery cells to perform one of: DC/AC and synchronous AC/DC conversion.

* * * * *